Nov. 27, 1951     K. A. SMITH ET AL     2,576,862

METHOD AND APPARATUS FOR PRESERVING FOODSTUFFS

Filed June 11, 1946     2 SHEETS—SHEET 1

INVENTOR
AND KENNETH A. SMITH
AND ARTHUR L. GRINNELL

BY *Harold W. Mattingly*

ATTORNEY

Nov. 27, 1951     K. A. SMITH ET AL     2,576,862
METHOD AND APPARATUS FOR PRESERVING FOODSTUFFS
Filed June 11, 1946     2 SHEETS—SHEET 2

INVENTOR
AND KENNETH A. SMITH
ARTHUR L. GRINNELL
BY Harold W. Mattingly
ATTORNEY Patented Nov. 27, 1951

2,576,862

UNITED STATES PATENT OFFICE 2,576,862

METHOD AND APPARATUS FOR PRESERVING FOODSTUFFS

Kenneth A. Smith, Burbank, and Arthur L. Grinnell, Los Angeles, Calif., assignors to Electronic Chemical Engineering Company, Los Angeles, Calif., a copartnership Application June 11, 1946, Serial No. 675,892

8 Claims. (Cl. 99—221)

Our invention relates to a method and apparatus for sterilizing foods in containers, and relates more particularly to the use of alternating electrical currents for sterilization.

The most common way to sterilize foods at present is to heat them to a suitable temperature for a sufficient length of time until the various organisms are killed. In the food preserving industry it is common practice to place the material to be preserved in a metal can or container provided with a metal cap, after which the container is sealed. The sealed container is then placed in an oven or autoclave and subjected to sufficient heat over a considerable period of time to kill the micro-organisms. Such a sterilization technique frequently results in cooking the food, and while this is desirable for some canned foods, such as vegetables, it is quite undesirable in others, including berries, milk, and the beverages wine and beer. The cooking of milk, for example, not only changes the taste but changes the composition. For this reason pasteurization is commonly employed and while many harmful bacteria are killed, certain others invariably survive as a source of disease and spoilage.

We have discovered, however, that bacteria and molds respond to electromagnetic and electrostatic waves, and while such waves may not kill the bacteria or mold, they render them incapable of reproducing. This sterilization of the micro-organisms is every bit as effective as killing them since the organisms are incapable of harm in the absence of multiplication, assuming, of course, that only normal numbers are present before being treated by the waves. The time period sufficient to sterilize the micro-organisms is generally so short that no heating of the food takes place.

The various micro-organisms (chiefly bacteria and mold) are sterilized principally by a certain range of wave frequencies characteristic of that selected micro-organism. The exact frequency to be applied varies within a considerable range, depending upon the substance within which they exist. For example, to sterilize the same micro-organism in dried fruits and in fruits canned in a liquid would call for two different frequencies because the dielectric and conductive properties of the two masses would be different. While we have used various frequencies, we find that most foods may be successfully treated by waves having a frequency in the range from 20 kilocycles to above 300 megacycles and the harmonics thereof.

The principal difficulty with using such waves, however, has been that a metal can acts as a perfect shield for these waves, effectively protecting the contents of the can from exposure to them. Inasmuch as the sterilization of foods can only be safely performed after the can is completely sealed, this shielding action has prevented the use of these waves. We have discovered, however, a way of introducing electromagnetic and electrostatic waves into a completely sealed metal can, and thus we are able to effectively sterilize canned foods.

It is therefore an object of our invention to sterilize micro-organisms by the use of electromagnetic and electrostatic waves.

Another object of the invention is to treat foods with such waves so that they can be kept indefinitely without spoilage due to micro-organisms originally associated with them.

Another object of the invention is to provide an electromagnetic treating method for preserving foods after they have been packaged or placed in a container.

Still another object of the invention is to provide means for subjecting the contents of a sealed metal can or a metal capped container to such waves.

A further object is to sterilize micro-organisms without the application of appreciable heat.

Another object is to provide a sterilization technique that renders the micro-organisms sterile in food placed in packages or containers.

Other objects and advantages of the invention will be apparent in the following description and claims considered together with the drawings, forming an integral part of this specification, in which:

Figure 1:
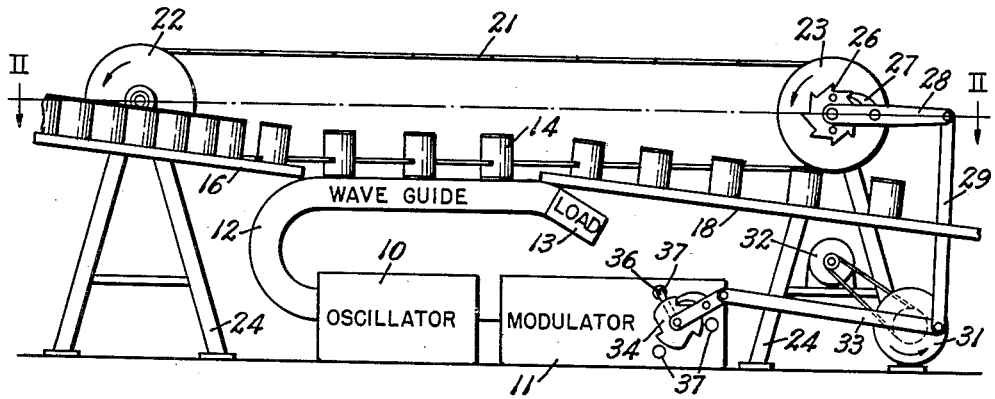
Fig. 1 is an elevation view of production apparatus embodying our invention.
Figure 2:
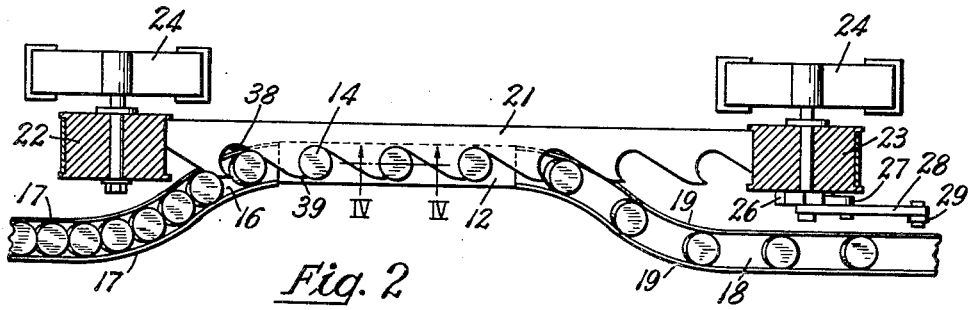
Fig. 2 is a plan view of the apparatus of Fig. 1 taken along the line II—II.

Figs. 1 and 2 illustrate our invention as applied to a processing plant for foods placed and sealed in metal containers such as the "tinned" steel cans customarily used for food products. Referring to these figures, a radio frequency or radar frequency oscillator 10 is connected to a modulator 11 which is adapted to amplitude modulate or frequency modulate the output of the oscillator 10 or to pulse modulate the same.

The modulated output of the oscillator is coupled to a wave guide 12, which curves to overlie the oscillator 10 and terminates in an appropriate load 13, such as graphited sand. The wave guide is preferably of rectangular cross-section. This terminal load may be adjusted to set up standing waves in the wave guide 12, or may be adjusted to absorb traveling waves, as by terminating the wave guide in its characteristic impedance. We prefer to terminate the wave guide by its characteristic impedance.

The horizontal part of the wave guide 12 acts as a tank or table upon which are slid containers 14 which have been previously filled with food, beverage or other article of consumption and sealed by any desirable method. While traveling along the wave guide, these cans are irradiated in accordance with the invention as described more fully hereinafter.

The containers 14 are illustrated as the common "tinned" steel can of commerce comprising a steel or other metal container protected by a tin plate, lacquer or other corrosion resisting coating. The cans 14 are supplied to the wave guide 12 by an inclined track 16 having upright side walls 17 spaced from each other by a distance just slightly greater than the diameter of the cans 14. The cans 14 are removed from the wave guide 12 by an inclined track 18 having upright walls 19.

The travel of the cans 14 across the wave guide 12 may be a steady movement, but in the form illustrated herein the movement is intermittent, whereby the cans pause at preselected points for a preselected period of time. This intermittent motion is supplied by an endless belt 21 stretched between two cylindrical pulley wheels 22 and 23, supported on brackets 24. Attached to pulley 23 is a ratchet wheel 26 contacted by a ratchet finger 27 pivoted to a ratchet lever 28. One end of the lever 28 is pivoted to the axle of pulley 23 and the other end is reciprocated by a connecting rod 29 driven by a rotating wheel 31 which in turn is driven by any desirable power source, such as an electric motor 32. The wheel 31 also drives a second connecting rod 33 which drives a ratchet wheel 34 rotatably mounted on the modulator 11 and having a contact arm 36 for making connection with a plurality of contacts 37. This is an elective feature of our invention, and by properly synchronizing ratchet wheels 26 and 34, a different modulating frequency may be selected for each pause of the endless belt 21.

The endless belt 21 has a series of pocket-like notches 38 formed in one edge thereof, having a sharp point 39 in the direction of travel of the belt 21. As shown most clearly in Fig. 2, the point 39 selects one of the cans 14 on the track 16, which track feeds them toward the belt 21 by a gravity slide. The pockets 38 are regularly spaced, and in the present embodiment are so related to the length of the horizontal portion of the wave guide 12 that three cans 14 are positioned on the wave guide at all times. The intermittent action of the belt 21 causes the cans to pause in the positions shown in Figs. 1 and 2, at which time they are irradiated as previously mentioned. Since each movement of the belt 21 moves the succeeding can 14 to the position previously occupied by the preceding can, each can pauses three separate times on the wave guide 12.

Figure 3:
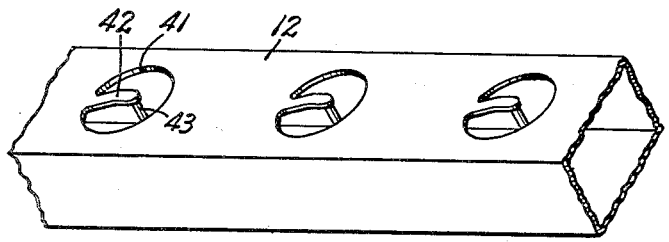
Fig. 3 is an isometric view of the wave guide of Fig. 1.
Figure 4:
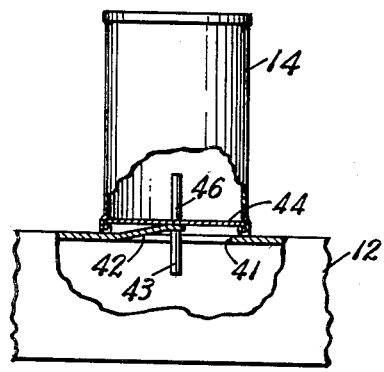
Fig. 4 is an elevation view in section of a part of the wave guide and container of Fig. 2 and taken along the line IV—IV of Fig. 2.
Figure 5:
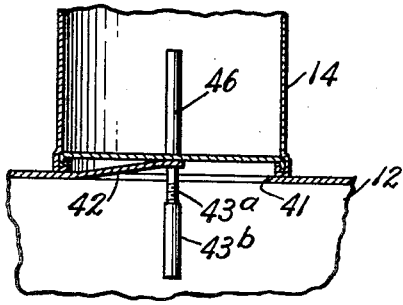
Fig. 5 is an elevation view in section of a wave guide showing a modification of our invention.

The mechanism for irradiating the cans 14 with electromagnetic waves is shown most clearly in Figs. 3, 4, and 5. Referring particularly to Fig. 3, it will be noted that the wave guide 12 has three circular holes 41 cut therein into which projects a strip of spring metal 42 having an antenna or probe 43 secured to the under surface thereof. If standing waves are utilized in the wave guide, the holes 41 must be carefully spaced.

The intermittent action of the belt 21 is so regulated relative to the position of the cans 14 that the three metallic cans 14 that pause on the wave guide 12 at any instant are perfectly centered over the holes 41. The cans 14 being of metal, bridge over the holes 41 in the wave guide and therefore substitute their bottom plate 44 for the missing metal removed in forming the holes 41. The can bottoms 44 therefore seal up and complete the wave guide as though the holes 41 were never formed therein.

The cans 14 may be the conventional cans of commerce except for one constructional feature. Soldered or otherwise secured to the inside of the bottom plate 44 of each can 14 is a rod or tube 46 of similar shape and length as the wave guide rod 43 secured to the wave guide spring 42. This can rod 46 acts as one-half of a dipole antenna, the other half being the wave guide rod 43. The spring 42 holds the antenna portion 43 in close electrical contact with the bottoms 44 of the cans 14 so that an effective electrical connection is established between the two dipole portions 43 and 46. The antenna portion 46 of the can radiates the electromagnetic waves picked up by the wave guide antenna portion 43. Thus in this manner our invention provides means for irradiating the interior of the metal can, that normally acts to shield out all electromagnetic waves.

The dipole portions 43 and 46 are preferably one-fourth wavelength each, thus giving an overall dipole length of one-half wavelength, though a shorter dipole may be used for reducing the emitted energy. Since the most practical dipole portion to place inside a "tin" can is several inches maximum because of the varying sizes of cans, a high oscillator frequency must be used. Thus for an overall dipole length (one-half wavelength) of 10 centimeters, a wavelength of 20 centimeters must be used, calling for a frequency of 1500 megacycles to be employed. For this reason we prefer to use oscillators of the type employed in radar equipment. The eight cavity magnetron tube has proved particularly useful since it delivers its output to a wave guide portion integral with the magnetron tube. The wave guide 12 need only to be connected to this wave guide portion. Further, the magnetron tube is easily modulated by applying the modulating potentials to the filament.

It appears that each micro-organism is peculiarly susceptible to waves of a specific frequency or small band of frequencies, and hence by subjecting a material such as a food or food product to a specific frequency lethal to a particular micro-organism or group of micro-organisms, sterility will be assured. Where several different micro-organisms are known or suspected to be in the product, the container may be subjected to a series of different frequencies, each known to be lethal to the specific micro-organism which it is desired to render sterile, or as hereinafter pointed out, the container may be subjected to waves, the frequency of which is altered gradually through a relatively wide band including the maximum and minimum lethal frequencies required to sterilize micro-organisms.

For example, beer has been successfully treated with frequencies ranging between 25 and 30 megacycles, with the result that tests show that all of the live yeasts in the beer were effectively killed or rendered sterile, and in addition A. flavus bacteria and penicillin glaucum were effectively rendered sterile. While it is believed that the lethal frequency was approximately 28 megacycles, the apparatus employed fluctuated in frequency between 25 and 30 megacycles, with the foregoing effective result. However Staphylococcus aureus was not appreciably affected by the wave treatment. It should be noted, however, that the temperature of the beer under treatment remained at atmospheric temperature, and the length of treatment required was less than 45 seconds; in fact 15 seconds proved sufficient for adequate sterilization.

As previously mentioned, the range of frequencies that we prefer to utilize in sterilizing micro-organisms is from 20 kilocycles to 300 megacycles. The modulator 11 is therefore tuned to any of these desired frequencies and the frequencies of the oscillator 10 act as a carrier for these sterilizing frequencies. Obviously, if the food contained in a can 14 is only a reasonable conductor of electricity, these high frequency carrier waves will penetrate only a short distance into the food. But the lower frequency modulations will penetrate to all portions of the food, striking the extreme walls of the can, and in some cases even being reflected within the can. The function of the carrier waves of the oscillator 10 is therefore to introduce into a sealed metal can these lethal rays of lower frequencies.

As previously mentioned, selected modulations are required to sterilize selected micro-organisms. Thus if there were three distinct types of micro-organisms in a particular food, three different modulating frequencies might be applied. This is the function of the ratchet wheel 34 on the modulator 11, the contact arm 36 selecting one modulating frequency for one setting of the cans 14, and moving on to the next contact 37, a second modulating frequency is selected for a second setting of the cans 14, and so on. In this manner each can receives one irradiation of one selected frequency, and receives a total of three modulation frequencies. This number of different modulations may be increased or decreased as desired, merely by having the number of cans on the wave guide being irradiated at any one time agree with the number of different modulations applied.

Where the type of micro-organism in the contents of the can and which it is desired to kill or render sterile is known, a particular selected modulating frequency may be employed with the assurance that that particular micro-organism will be properly treated. Where the character of the micro-organisms is not known, it may be desirable to treat the contents of the can with a maze of frequencies, and for this purpose a modulating oscillator may be used which will produce a gradually increasing or gradually decreasing modulating frequency over a relatively wide range, and a control device for the oscillator may be substituted for the several switch contacts 37 shown in Fig. 1. Thus whenever the container is in one of the selected positions on the wave guide 12 the control device may be moved throughout its entire range of movement to provide an infinite number of different wave frequencies for treating the contents of the can.

Also it may be noted that the modulation may be a pulse modulation as by repeatedly starting and stopping the production of the carrier wave at a selected frequency.

While in many instances it will be found that a particular micro-organism responds to the fundamental modulating frequency, it may occur that the necessary frequency is beyond the range of the particular apparatus employed. In such case, an harmonic of the desired modulating frequency may be effectively used.

Shown in Fig. 5 is a modification of our invention in the form of a dipole portion that is adjustable in length. This antenna portion includes a stationary member 43a that is externally threaded to receive an internally threaded member 43b. By means of this structure, the wave guide dipole portions may be accurately adjusted to the length of the dipole portion in the cans 14. The oscillator frequency also would have to be changed in any such adjustment.

Figure 6:
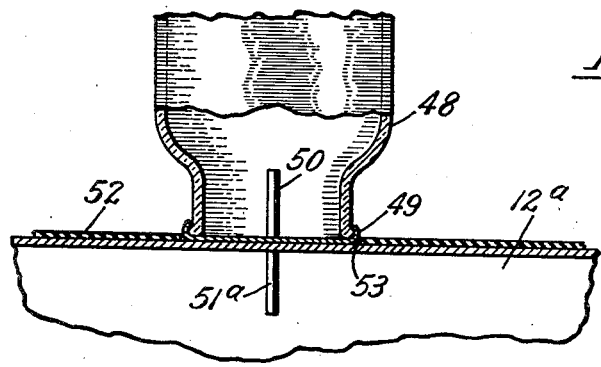
Fig. 6 is a detail fragmentary sectional view of a portion of a modified form of wave guide and a portion of a modified form of container which may be employed in the practice of our invention.

Shown in Fig. 6 is a modification of our invention as applied to a glass food container 48 having a metal cover 49 on which is secured a quarter wave antenna 50. By merely passing this non-metal container over the apparatus of Figs. 1 and 2, the contents would be irradiated. However in Fig. 6 there is illustrated a modified form of wave guide 12a which may be substituted for the wave guide 12 of Figs. 1 through 5. In this form of wave guide the upper wall is solid throughout its length, and dipoles 51a are secured to the inner surface of the upper wall at predetermined, spaced intervals along the length of the wave guide increasing to the center of the position which will be occupied by the can or container 48 as it progresses in step-by-step movement along the wave guide. Thus the dipole 50 secured to the container top 49 will be disposed exactly in alignment with the dipole 51a.

To aid in the exact centering of the dipole 50 over the location of the dipole 51a, we may employ a sheet of plastic or other insulating material 52 over the upper surface of the wave guide to define an insulating surface over which the containers will move between successive wave treating stations. However the plastic sheet may be perforated with relatively large circular openings as indicated at 53 conforming in diameter with the diameter of the cover 49 and thus acting as an automatic centering guiding means for definitely locating the container 48 in the desired treatment position.

Our general scheme of having a dipole portion attached to the inside of a metal container or metal part of a container makes possible the utilization of present day can production machinery and techniques. Only a single added operation is all that is required; namely, adding the dipole portion to the inside of the containers as illustrated in Figs. 4, 5 and 6. The outside appearance of the container is not changed, eliminating any possibility of customer sales resistance. The fact that the food is rendered "sterile" by radio waves or radar waves might prove to be an important sales advantage. The antenna or dipole portion projecting into the container can be made small so that it will not damage the contents.

We are not certain of the exact process by which the electromagnetic waves render the micro-organisms sterile. We do not know whether it is the electric field effect of the waves or the magnetic field effect or the combination of the two effects, and wherever the expression "electromagnetic wave" is used herein it is intended to include both phenomena. We do not know whether it takes a single cycle or many cycles of modulation waves to effect the sterilization of the micro-organisms. For this reason we prefer to irradiate the food with electromagnetic waves for several seconds, at least five to twenty seconds being the duration utilized at present.

The carrier frequency of the oscillator 10 need not be the frequency resulting in the half wavelength of the dipoles, as any even harmonic of the oscillator may be used by the dipole since the dipole is a high Q frequency responsive element. This factor permits the use of the frequencies that are at present assigned to commercial operations, such as 13.6 megacycles, 27 megacycles and 40 megacycles, if the size of the containers does not permit operation on the fundamental frequency. Also, as previously stated, modulation frequencies outside of our preferred range might be used.

The operation of the apparatus of Figs. 1 and 2 is as follows: The motor 32 is started, causing the wheel 31 to rotate, which in turn drives the ratchet lever 28. The lever 28, together with the pivoted finger 27 cause the ratchet wheel 26 to rotate, and in turn driving the pulley wheel 23. The intermittent rotation of the pulley wheel causes the endless belt 21 to travel with a corresponding intermittent motion.

Cans 14 which have been filled previously with food and sealed are supplied to the inclined slide 16, which in turn feeds them to the belt 21 by a gravity slide of the cans thereon. The pointed portion 39 of the belt pockets 38 engages a can 14 on the slide 16 as the belt 21 moves as indicated, and because of the constraining action of the slide wall 17, forces a can 14 into a pocket 38. Thereafter the can is held in the pocket 38 by the movement of the belt 21. When the belt 21 stops during its intermittent motion, the cans 14 held therein also stop and are perfectly centered over the holes 41 (Fig. 3) in the wave guide 12. Each can 14 pauses once over each hole 41, receiving radiations from the wave guide 12. When the cans move off of the wave guide 12 onto the slide 18, they are engaged by the back upright slide side 19, or in Fig. 2 by the upper side 19. This contact, together with the forward motion of the belt 21, forces the cans 14 out of the pockets 38. Gravity then acts on the cans 14 on slide 18, causing the cans to slide away from the belt 21.

The electromagnetic waves in the wave guide 12 are supplied by an oscillator 10 as modulated by a modulator 11. These modulated waves travel down the wave guide 12 to the load 13 where they are absorbed. The ratchet wheel 34 selects one modulating frequency for each pause of the cans on the wave guide 12, giving a variety of modulations to which each can is exposed.

The operation of the mechanism for taking energy from the wave guide and delivering it inside the cans 14 is shown in Figs. 3, 4 and 5. The probe or dipole portion 43 is exposed to the electric field of each wave as it passes down the wave guide 12. These electric fields cause a corresponding movement of electrons in the dipole portion 43. When electrically connected with a can dipole portion as shown in Fig. 4, this electron flow is transmitted to the can dipole portion 46. The two portions 43 and 46 together make a half wavelength dipole, the can portion 46 radiating modulated energy in much the same fashion as a radio antenna. The action of the wave guide portion 43 is just the reverse of the action in feeding energy into a wave guide from a concentric cable, in which the inner cable conductor projects one-fourth wavelength into the wave guide. The modulated frequencies are the lethal frequencies and when micro-organisms inside of the cans 14 are irradiated by them, they are quickly sterilized.

Figure 7:
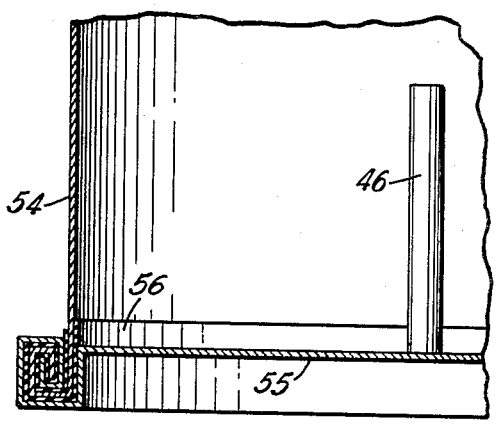
Fig. 7 is a fragmentary sectional view of a metal can or container illustrating a still further modified form in which our invention may be practiced.

In Fig. 7 we have illustrated a still further modified form of can which may be employed in the practice of our invention as comprising the usual metal can construction in which the body 54 of the can has the usual metal closure at one of its ends, while at the opposite end there is a metal closure 55 the edge of which is rolled relative to the edge of the can body 54 by the usual can closing machinery. However, interposed between the metal of the body 54 and the closure 55 is a strip or coating of an electrical insulation material 56. A coating of plastic or a strip of plastic, paper, impregnated fabric or the like may be used so long as it effectively insulates the closure 55 from the body of the can 54.

Attached to the closure 55 is the dipole 46 in the same manner as was described with reference to Figs. 1 through 5.

It should be emphasized that the type of container shown in Fig. 7 may be constructed with the usual can-making machinery without appreciable alteration, it being only necessary to provide the insulation strip which may be attached to either the can body or the closure in the process of manufacturing the can.

Figure 8:
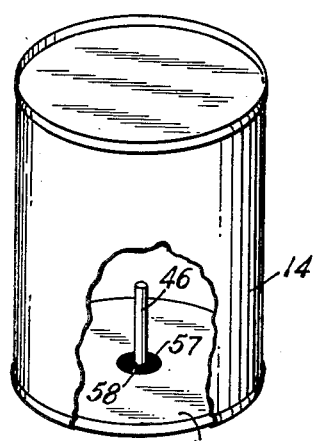
Fig. 8 is a fragmentary perspective view of a still further modified form of container which may be employed in the practice of our invention.

In Fig. 8 we have illustrated a still further modified form of container as comprising the ordinary metal can construction 14 having the ordinary closure 44 modified only by the fact that at the center of the closure 44 a relatively large diameter opening is punched as indicated at 57 and a dipole 46 is inserted through this opening and secured therein by means of a disc of electrical insulation material 58.

Although our invention has been described with reference to particular embodiments thereof, it is not limited to these embodiments, nor otherwise, except by the terms of the following claims.

We claim:

1. The method of sterilizing micro-organisms in foods which includes the step of subjecting the foods to electromagnetic waves of a radio carrier frequency and modulating the carrier with a frequency of such high value as will not cause appreciable heat in the foods, but which is lethal to the micro-organisms.

2. The method of sterilizing selected micro-organisms in foods which consists of subjecting the foods to a plurality of different radio frequencies of electromagnetic waves.

3. The method of sterilizing foods which includes the step of sequentially subjecting the foods to a plurality of different radio frequencies of electromagnetic waves.

4. The method of sterilizing foods which includes the step of subjecting the foods to radio electromagnetic waves and varying the frequency of said waves through a predetermined range of frequencies.

5. The method of sterilizing micro-organisms including subjecting them to electromagnetic waves of a radio carrier frequency, and modulating the carrier with a frequency in the range from 20 kilocycles to 300 megacycles.

6. The method of preserving food placed in containers including the steps of generating electromagnetic waves at a radio carrier frequency, modulating the carrier frequency with a frequency from the range of 20 kilocycles to 300 megacycles, and introducing this modulated carrier inside the container.

7. Apparatus for treating products subject to spoilage in containers having a conductor projecting therein comprising means for generating a carrier frequency whose wavelength or multiple is four times the length of the conductor in the container, means for modulating the carrier with a lethal frequency, a wave guide coupled to the modulated output of the generator, and having holes formed therein, a probe secured to the wave guide near the center of each hole and projecting into the wave guide and having a length similar to that of conductor, and means for intermittently moving along the wave guide a plurality of containers corresponding to the number of holes, the intermittent movement being so adjusted with respect to the position of the holes that each container pauses over each hole.

8. Apparatus for treating products subject to spoilage in a container having a conductor projecting therein comprising means for generating a carrier frequency whose wavelength or multiple is four times the wavelength of the conductor in the container, means for modulating the carrier with one of a selected number of lethal frequencies, a wave guide coupled to the modulated output of the generator and having a number of holes therein corresponding to the selected number of modulating frequencies, a probe secured to the wave guide near the center of each hole and projecting into the wave guide, means for intermittently moving along the wave guide a number of containers corresponding to the number of holes therein, and means for selecting a different modulation frequency every time a container moves from one hole to the next.

KENNETH A. SMITH.
ARTHUR L. GRINNELL.

REFERENCES CITED

The following references are of record in the file of this patent:

UNITED STATES PATENTS

| Number | Name | Date |
| --- | --- | --- |
| 645,569 | Roberts | May 20, 1900 |
| 734,305 | Crotte | July 21, 1903 |
| 800,791 | Bowden | Oct. 3, 1905 |
| 902,758 | Nielsen | Nov. 3, 1908 |
| 1,522,188 | Hull | Jan. 6, 1925 |
| 1,863,222 | Hoermann | June 14, 1932 |
| 1,911,879 | Bohart | May 30, 1933 |
| 1,914,947 | Golden | June 20, 1933 |
| 1,945,867 | Rawls | Feb. 6, 1934 |
| 1,972,050 | Davis | Aug. 28, 1934 |
| 1,981,583 | Craig | Nov. 20, 1934 |
| 2,006,265 | Davis | June 25, 1935 |
| 2,013,675 | Steerup | Sept. 10, 1935 |
| 2,114,345 | Hayford | Apr. 19, 1938 |
| 2,223,813 | Brown | Dec. 3, 1940 |
| 2,509,258 | Wing | May 30, 1950 |

FOREIGN PATENTS

| Number | Country | Date |
| --- | --- | --- |
| 526,719 | Great Britain | Sept. 24, 1940 |
| 545,936 | Great Britain | June 18, 1942 |

OTHER REFERENCES

"The Differential Between the Effect of Radio Waves on Insects and Plants," April 1931, Abstract N. J. Agr. Exp. Station by T. J. Headlee. Pages 427 to 432.